US009108564B2

(12) United States Patent
Petker

(10) Patent No.: US 9,108,564 B2
(45) Date of Patent: Aug. 18, 2015

(54) HOLDER FOR A LIGHT SOURCE IN THE OPENING OF A REFLECTOR

(71) Applicant: Hella KGaA Hueck & Co., Lippstadt (DE)

(72) Inventor: Waldemar Petker, Bünde (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 56 days.

(21) Appl. No.: 14/036,955

(22) Filed: Sep. 25, 2013

(65) Prior Publication Data

US 2014/0085921 A1   Mar. 27, 2014

(30) Foreign Application Priority Data

Sep. 26, 2012   (DE) .......................... 10 2012 109 059

(51) Int. Cl.
 *B60Q 1/04*   (2006.01)
 *F21S 8/10*   (2006.01)
(52) U.S. Cl.
 CPC ........... *B60Q 1/0408* (2013.01); *F21S 48/1113* (2013.01); *F21S 48/1168* (2013.01)
(58) Field of Classification Search
 CPC .......................... F21S 48/1113; F21S 48/1168
 USPC .................................................. 362/548, 549
 See application file for complete search history.

(56) References Cited

U.S. PATENT DOCUMENTS

| 6,710,526 | B1 * | 3/2004 | Helbig | 362/640 |
| 7,264,391 | B2 * | 9/2007 | Kaandorp | 362/649 |
| 2010/0103692 | A1 * | 4/2010 | Helbig | 362/548 |
| 2013/0272010 | A1 * | 10/2013 | Kawamura | 362/519 |

FOREIGN PATENT DOCUMENTS

| DE | 43 23 118 C1 | 1/1995 |
| DE | 43 34 719 A1 | 4/1995 |
| DE | 44 36 409 C1 | 12/1995 |
| DE | 196 32 907 A1 | 2/1998 |
| DE | 100 59 676 A1 | 6/2002 |
| EP | 1 463 908 B1 | 4/2008 |

* cited by examiner

*Primary Examiner* — Anabel Ton
(74) *Attorney, Agent, or Firm* — Husch Blackwell LLP

(57) ABSTRACT

A holder for a light source in the opening of a reflector for a vehicle headlamp, includes a retention ring extending in a ring plane, for an arrangement on the reflector, wherein the light source can be retentively arranged in the opening of the reflector. To allow a safe arrangement of the light source in the opening of the reflector and to prevent that a number of retention rings can get entangled, it is provided according to the invention, that the retention ring has tongues holding the light source in the opening of the reflector by means of elastic spring deflection, the tongues having a first tongue end and a second tongue end, and wherein the tongue ends lie essentially on the ring plane of the retention ring.

26 Claims, 3 Drawing Sheets

HOLDER FOR A LIGHT SOURCE IN THE OPENING OF A REFLECTOR

CROSS REFERENCE

This application claims priority to German Patent Application No. 10 2012 109059.9, filed Sep. 26, 2012.

TECHNICAL FIELD OF THE INVENTION

The present invention relates to a holder for a light source in the opening of a reflector for a vehicle headlamp. The holder has a retention ring extending in a ring plane for the arrangement on the reflector, wherein the light source is retentively arranged in the opening of the reflector.

The reflector and the light source can for example be used to form a module for the provision of a low beam light or a high beam light in the vehicle headlamp; the vehicle headlamp may also be used as a general lighting means for a vehicle, e.g. a rearlamp. Herein, it is known, that light sources are inserted from the back of the reflector into the opening of the reflector, and are rotated by a certain angle range. Herein, holding arms arranged on the light source grip behind certain areas of the retention ring, so that the light source is arranged on the reflector from the back through the retention ring in the manner of a bajonet lock. To this end, often there are three cut-outs arranged on the retention ring, and for the insertion of the light source in the opening of the reflector, the holding arms of the light source must be arranged to meet the cut-outs on the retention ring. Once the light source is inserted, a rotational movement is started, which is continued until it is snap-fastened between the edge of the opening of the reflector and the retention ring.

BACKGROUND OF THE INVENTION

U.S. Pat. No. 5,938,323 A1 shows a holder for a light source in the opening of a reflector for a vehicle headlamp, and a retention ring for the arrangement on the reflector is provided, which has a base body and extends in a ring plane. For the fastening of the retention ring on the opening of the reflector, the retention ring has snap-fastening tabs by means of which the retention ring can be snapped on to the opening of the reflector. The snap-fastening tabs protrude vertically from the ring plane of the retention ring and form barbed hooks, so that the snap-fastening tabs can be snap-fastened to the openings of the reflector.

EP 0 900 974 A2 shows a further holder of a light source in the opening of a reflector for vehicle headlamps, and a retention ring is shown, with which the light source is held in the opening of the reflector. The retention ring has a multitude of expandable elements, holding elements and fastening tongues which each do even form undercuts. Herein the retention ring is embodied as a pressed and bent part and the elements and tongues protruding from the ring plane of the retention ring can get entangled when several retention rings are for example provided in a container for the assembly on the reflector.

Particularly in automatic assembly this is a disadvantage impairing the handling of the retention ring or even making it impossible. When a larger number of retention rings is provided in a container, the retention rings can get caught amongst each other with their molded expandable elements, holding elements and/or fastening tongue which makes the automatic gripping of an individual retention ring for automatic assembly impossible. Magazined provision of retention rings is often space- and cost-intensive and should be avoided.

To avoid this problem, know retention rings possess only pressure points, which are formed on to the base body, and with which the light source is retained in the opening of the reflector. Disadvantageously, the dimensions of the base of the light sources have rather large tolerances, and differences in height of the lamp base could lead to the light source hardly being held by the retention ring or not being held at all.

SUMMARY OF THE INVENTION

Therefore, the invention is based on the task of developing a holder of a light source in the opening of a reflector for a vehicle headlamp, which allows a simplified and safe arrangement of the light source in the opening. In particular, the task of developing retention rings which can be automatically mounted in an improved manner arises.

This task is solved by a holder for a light source in the opening of a reflector for a vehicle headlamp according to the preamble of claim 1 in connection with the marked features. Advantageous further developments of the invention are given in the dependent claims.

The invention includes the technical teaching, that the retention ring has tongues holding the light source in the opening of the reflector under elastic spring deflection, the tongues having a first tongue end and a second tongue end, and that the tongue ends lie essentially on the ring plane of the retention ring.

The invention is based on the thought of developing a retention ring for the arrangement on the opening of the reflector, being embodied with tongues, so that the light source, and in particular the base of the light source, is held in the opening of the reflector by the tongues developing an elastic compliance. An area of compliance being formed by the tongues results in particular between the retention ring and the light source, and dimensional tolerances, particularly of the base of the light source, are absorbed by a correspondingly differing spring deflection of the tongues. Accordingly, a safe arrangement of the light source in the opening of the reflector is always ensured, which is independent of incidental dimensional tolerances of the base of the light source. It is particularly advantageous that the tongues are embodied so that several retention rings contained in a container can no longer get entangled. To this end, the tongues are to be executed so that the tongue ends are placed approximately on the ring plane. By this means, undercuts are avoided, with which, for example, a further retention ring could get hooked up with its base body or with its tongues. The retention rings executed according to the invention could be provided in large numbers in one container for automatic assembly to the reflector without getting entangled. In particular, the retention rings could be picked up individually by an automatic handling system without the retention rings having to be disentangled.

Advantageously, the tongues form a compliant area protruding from the ring plane between the tongue ends. The contact point of the tongues for the contact with the light source does herein not lie at the end of the tongue, but between the first tongue end and the second tongue end. In particular, the tongue can raise from the ring plane between the tongue ends, and therefore also protrude from the latter in the direction of the lamp base. However, the protruding area of the tongue does not form an undercut in which other retention rings could get entangled. The arrangement of both tongue ends on the ring plane results in an altogether closed contour, and no open areas occur in which other retention rings could get entangled. Nevertheless, a spring deflection of the tongues is possible by means of the retention ring with the tongues according to the invention to provide an element of compliance between the base of the light source and the reflector.

According to a first possible embodiment, the first tongue end can have a connection with the base body of the retention ring extending in the ring plane. Herein, the second tongue end can have a free end. The free end, however, is bent back into the ring plane of the retention ring, and between the tongue ends, the form of the tongue can for example be C-shaped or S-shaped. Therefore, the contact point of the tongue relative to the light source lies on the curve between the two tongue ends. By connecting only one end of the tongue to the base body of the retention ring, a large degree of compliance of the tongue is achieved.

According to a further embodiment of the invention, both tongue ends could also have a connection to the base body of the retention ring. Even when both tongue ends are connected to the base body, the shape of the tongue can be formed to protrude from the ring plane of the base body, for example by a respective punching and bending process. When both tongue ends are particularly integrally formed with the retention ring preferably made from a sheet metal material, a significantly increased stiffness of the tongue on the base body is the result, so that the compliance of the tongue is significantly less that if the latter were connected to the base body only with one tongue end and a further end were to remain free.

According to an advantageous embodiment the retention ring can be fastened to the reflector by means of connecting elements, wherein preferably three connecting elements are distributed over the circumference of the base body of the retention ring at approximately identical angles. The connecting elements could for example be embodied as screws by means of which the retention ring is screwed onto the opening of the reflector. Preferably, three connecting elements could be provided, wherein, however, also two or more than three connecting elements can form a possible embodiment for the connection of the retention ring with the reflector.

In particular, the tongues can be arranged on the retention ring in the free space occurring between the connecting elements. If for example three connecting elements are planned, three intermediate spaces are also formed, and in each of these intermediate spaces, there is preferably one tongue. In particular, the number of tongues can correspond to the number of the connecting elements.

The retention ring is preferably formed from a thin sheet metal material, which has been formed into the shape of a retention ring by means of punching and bending processes. The retention ring has a centrally arranged opening corresponding to the opening of the reflector. Herein, the tongues can be placed in the edge of the center opening of the retention ring.

Due to the flexibility of the sheet metal material for the forming of the base body of the retention ring it can also be resilient; and it is advantageous when the areas between the arrangement of the connecting elements form resilient zones which rebound when the maximum spring deflection of the tongues from the ring plane of the retention ring is reached. Therefore, the compliance of the retention ring can be two-stage, and in a first stage, the tongues deflect, and should further deflection be required, the resilient zones in the base body of the retention ring can give way themselves and therefore deflect. Oversize lamp bases in particular can lead to a deflection of the resilient zones of the base body of the retention ring, wherein the area in which the connecting elements are arranged rigidly connect the retention ring with the reflector, so that no deflection takes place in this area.

The light source can have holding arms engaging behind the retention ring in the areas between the connecting elements. The holding arms can be placed in the resilient zones of the retention ring by rotation of the light source, wherein in the deflection of the tongues and in particular the deflection of the resilient zones is induced by the rotation of the light source and by the arrangement of the holding arms beneath the resilient zones of the retention ring.

According to a further improved embodiment of the retention ring, it has tabs for the protection against rotation, which are bent vertically from the ring plane of the base body and which are executed without undercuts. Furthermore, all further elements introduced to the base body of the retention ring, in particular by punching and bending processes, but also by other processes, can be executed without undercuts, so that any catching of retention rings amongst each other also on other elements arranged on the retention ring, is avoided.

The retention rings can therefore be provided for assembly as bulk material and do not have to be magazined before they are fed into the assembly process by means of an automatic handling system. Herein, particularly the embodiment of the tongue according to the invention plays a special role, but also the tabs for the protection against rotation, which are also bent from the ring plate of the retention ring, are executed so that they cannot get entangled with other retention rings.

Furthermore, the present invention relates to a retention ring for the forming of a holder for a light source in the opening of a reflector for a vehicle headlamp extending in a ring plane and which is embodied for an arrangement on the reflector, so that the light source can be arranged in the opening of the reflector by means of the retention ring. According to the invention, the retention ring has tongues to hold the light source in the opening of the reflector by means of elastic spring deflection, wherein the tongues have a first tongue end and a second tongue end, and wherein the tongue ends lie essentially on the ring plane of the retention ring. Herein, it is understood that the further characteristics and described advantages of the holder described above also applies to the retention ring according to the invention.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
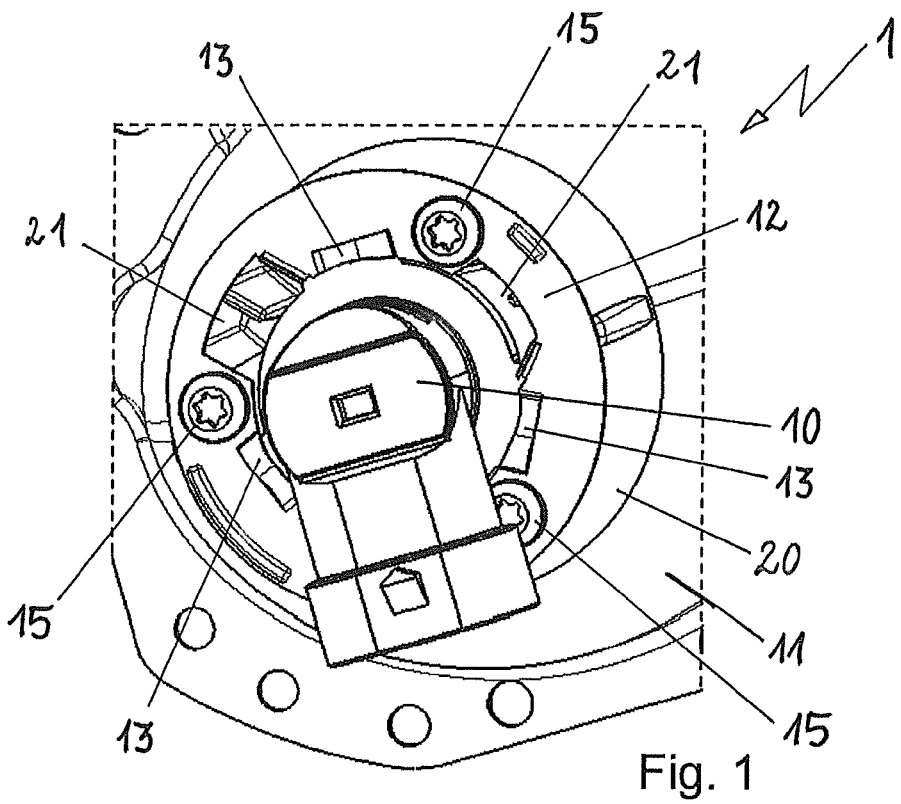
FIG. 1 an embodiment of a holder with a retention ring according to the invention, FIG. 2 a perspective representation of a light source for reception in the opening of the reflector, FIG. 3 a perspective view of a retention ring according to the invention, FIG. 4a a detail view of a tongue according to a first exemplary embodiment, FIG. 4b a detail view of a tongue according to a further exemplary embodiment and FIG. 5 a cross-sectional view of the holder of the light source in the opening of the reflector with a retention ring according to the invention.

FIG. 1 shows a perspective view of the holder 1 of a light source 10 in the opening of a reflector 11 for a vehicle headlamp. A receiving neck insert 20 is integrally molded onto the reflector 11, which, with its end forms the opening of the reflector 11 and which has a circumventing edge. A retention ring 12 is fastened to the circumventing edge with three connecting elements 15 in the form of screws 15.

In the areas between the screws 15, the retention ring 12 has tongues 13. With the tongues 13, the light source 10 is held in the opening of the reflector 11 on the receiving neck 20.

Figure 2:
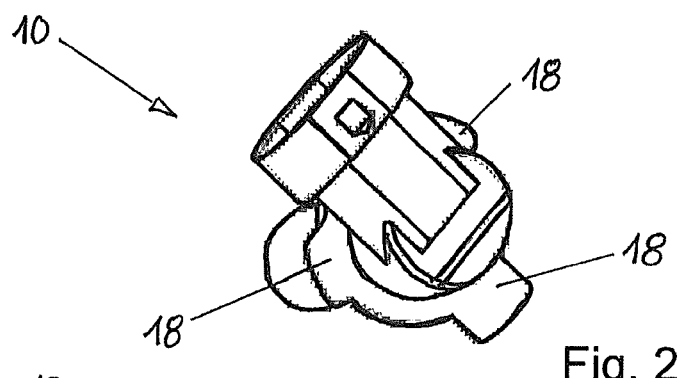

When also viewing FIG. 2, it can be recognized, that the light source 10 has holding arms 18. Three holding arms 18 are molded on the light source 10 with an irregular angle distribution. On the retention ring 12, there are recesses 21 on the edge of the central opening of the retention ring 12 in positions corresponding to the arrangement of the holding arms 18. For the fastening of the light source 10 on the reflector 11, the holding arms 18 of the light source 10 are placed over the recesses 21 in the retention ring 12, so that the holding arms 18 are guided by the recesses 21 into an intermediate space between the retention ring 12 and the receiving neck 20 on the reflector 11. Then the light source 10 is rotated, so that the holding arms 18 are rotated beneath the tongues 13 of the retention ring 12. The rotation of the light source 10 causes an elastic spring deflection of the tongues 13 on the retention ring, so that the light source is attached to the reflector safely and reproducibly by means of the holding arms 18.

Figure 3:
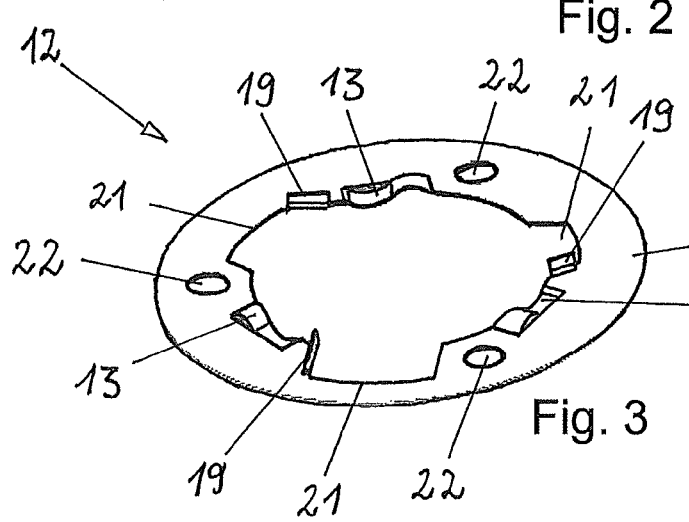

FIG. 3 shows a perspective view of the retention ring 12 having a base body 16 and being for example formed from a sheet metal material by means of punching and bending processes. The base body 16 has, in an exemplary embodiment, three tongues 13 being placed on the edge of the center opening of the retention ring 12. The tongues form a central spring area, which is bend out of the ring plane of the base body 16. Furthermore, the retention ring 12 is shown with tabs for the protection against rotation 19 which shall protect against incorrect installation of the light source 10 or avoid the installation of incorrect or unsuitable light sources. Furthermore, through-bores 22 for the reception of the screws 15 according to FIG. 1 are shown. Herein it can be recognized, that the tabs for the protection against rotation 19 are adjacent to the recesses 21. The tabs for the protection against rotation 19 come into operation whenever the holding arms 18 do not correspond to the recesses 21, but a user tries nevertheless to mount the light source 10. In this situation the tabs for the protection against rotation 19 prevent the mounting of the light source 10.

Figure 4A:
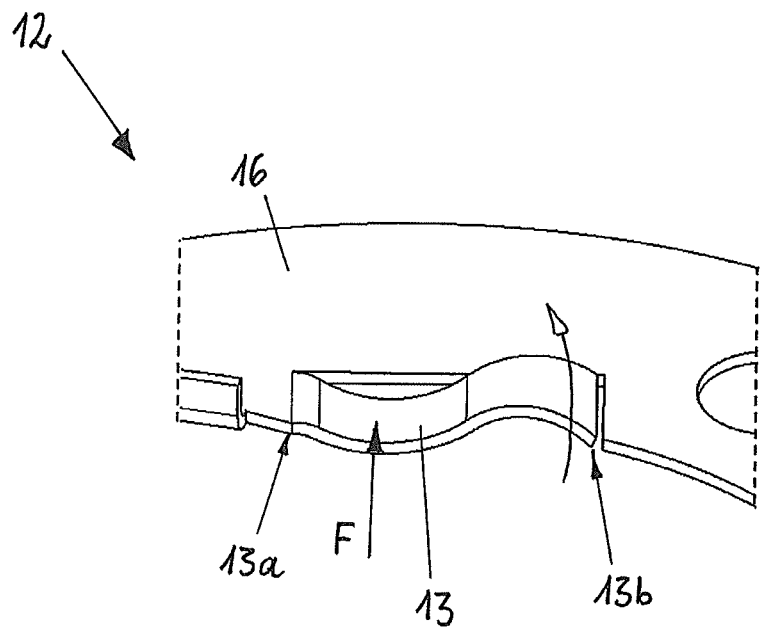

FIG. 4a shows a first exemplary embodiment of a tongue 13 on the base body 16 of the retention ring 12, wherein the tongue 13 is shown with a first tongue end 13a and a second tongue end 13b. Herein, the tongue 13 is connected with the base body 16 of the retention ring 12 via the first tongue end 13a only. The second tongue end 13b ends essentially as a free end on the ring plane and whenever a light source applies a force F against the lower side of the tongue 13, the tongue 13 shows an elastic spring deflection in the direction of the arrow. Herein, the second, free tongue end 13b wanders out of the ring plane of the base body 16, resulting in a large degree of compliance of the tongue 13.

Figure 4B:
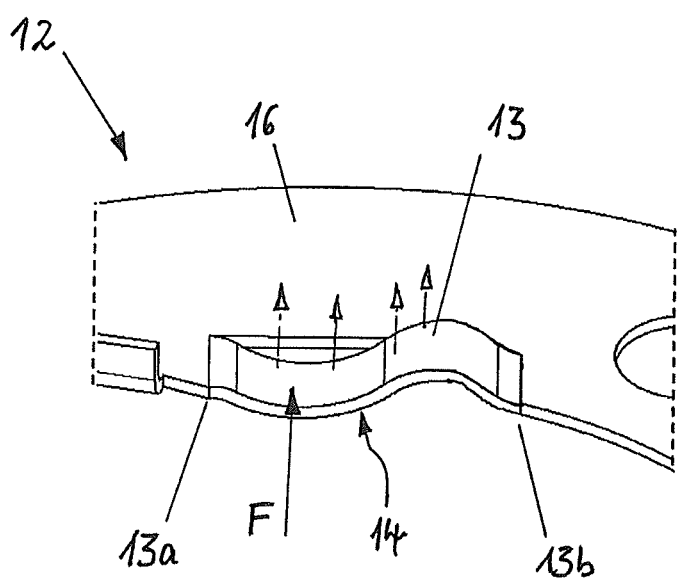

FIG. 4b shows a further exemplary embodiment of a tongue 13 on the base body 16 of the retention ring 12, wherein the first tongue end 13a as well as the second tongue end 13b is connected to the base body 16. A compliant area 14, yielding in the indicated direction of the arrow when the force F is applied on the tongue 13, is formed between the two tongue ends 13a and 13b as both ends of the tongue 13 are connected to the base body 16. This embodiment of the tongue 13 features a significantly increased stiffness, which prevents that already during transport of the retention ring 12, the tongue 13 is deformed by uncontrolled application of force so that the second, free tongue end 13b is bent out of the ring plane of the base body 16, resulting in an undesirable entangling of retention rings 12.

Figure 5:
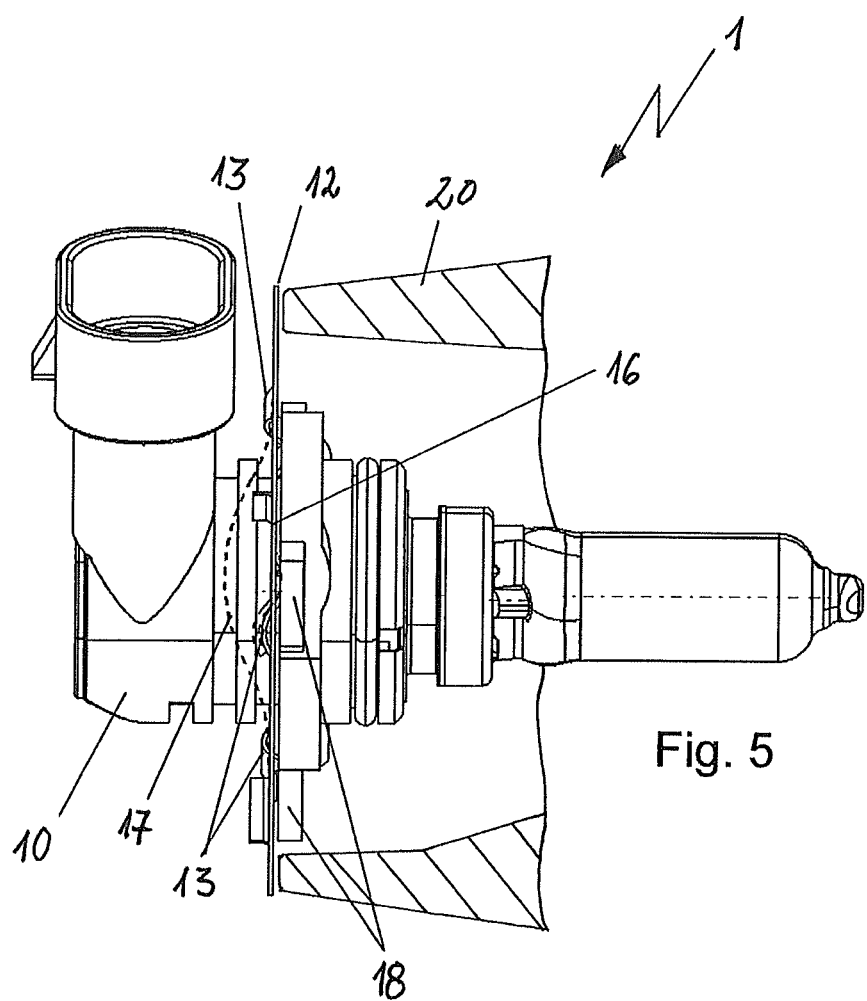

FIG. 5 shows a cross-sectional view through the holder 1 of the light source 10 in the opening of the reflector being represented by the receiving neck 20. In the cross-sectional view, the arrangement of the retention ring 12 on the circumventing edge of the receiving neck 20 can be recognized, wherein the base of the light source 10 with the holding arms 18 is arranged beneath the retention ring 12. Herein the holding arms 18 press against the tongues 13 of the retention ring 12 from below. One tongue 13 is exemplarily represented with a dashed line showing how the tongue 13 can elastically deflect when the holding arms 18 of the light source 10 act upon the retention ring 12.

Furthermore, a resilient zone 17 is exemplarily represented, which shows an elastic excursion of part of the retention ring 12 in the shape of a bending line which is not drawn to scale. The resilient zones 17 can each be in the region of the tongues 13, and if a tolerance dimension of the holding arm 18 occurs, which is so large that the elastic deflection of the tongue 13 has already reached a maximum, the base body 16 of the retention ring 12 can yield according to the resilient zone 17 being only represented in a qualitative manner. By this means, an extended elastic zone of the retention ring 12 is created to ensure a safe arrangement of the light source 10 on the reflector 11 even with extreme dimensional variations.

The invention is not restricted in its execution to the preferred embodiments described above. Rather, a multitude of variants is conceivable, which uses the described solution also in fundamentally different executions. All characteristics and/or advantages arising from the claims, the description or the drawings, including design details, spatial arrangements and/or advantages, on their own or in the most varied combinations are essential for the invention.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SIGNS

1 Holder
10 Light source
11 Reflector
12 Retention ring
13 Tongue
13a First tongue end
13b Second tongue end
14 Compliant area
15 Connecting element, screw
16 Base body
17 Resilient zone
18 Holding arm
19 tab for the protection against rotation
20 Receiver neck
21 Recess
22 Through-bore
F

The invention claimed is:

1. A holder for a light source in the opening of a reflector for a vehicle headlamp, comprising:
a retention ring extending in a ring plane, for an arrangement on the reflector, wherein the light source is retentively arranged in the opening of the reflector,
wherein the retention ring has tongues holding the light source in the opening of the reflector by elastic spring deflection, the tongues having a first tongue end and a second tongue end,
wherein the tongue ends lie essentially on the ring plane of the retention ring, and wherein the tongues comprise a compliant tongue ends protruding from the ring plane of the retention ring.

2. The holder according to claim 1, wherein the first tongue end has a connection with a base body of the retention ring extending in the ring plane and the second tongue end is an unattached end.

3. The holder according to claim 1, wherein both tongue ends form a connection with a base body of the retention ring.

4. The holder according to claim 1, wherein the retention ring is fastened to the reflector by at least one connecting element.

5. The holder according to claim 1, wherein the retention ring is fastened to the reflector by three connecting elements that are distributed over the circumference of a base body of the retention ring at approximately identical angles.

6. The holder according to claim 5, wherein areas between the connecting elements form spring zones, which rebound from the ring plane of the retention ring once a maximal compression of the tongues is reached.

7. The holder according to claim 5, wherein the light source has holding arms engaging behind the retention ring in areas between the connecting elements.

8. The holder according to claim 1, wherein the retention ring comprises tabs for resistance to rotation, which are bent vertically from the ring plane of a base body and which are executed without undercuts.

9. The holder according to claim 5, wherein the tongues are arranged in areas between the connecting elements.

10. A holder for a light source in the opening of a reflector for a vehicle headlamp, comprising:
a retention ring extending in a ring plane, for an arrangement on the reflector, wherein the light source is retentively arranged in the opening of the reflector,
wherein the retention ring has tongues holding the light source in the opening of the reflector by elastic spring deflection, the tongues having a first tongue end and a second tongue end, and wherein the retention ring is fastened to the reflector by at least one connecting element.

11. The holder according to claim 10, wherein the tongues comprise a compliant area between the tongue ends protruding from the ring plane of the retention ring.

12. The holder according to claim 10, wherein the first tongue end has a connection with a base body of the retention ring extending in the ring plane and the second tongue end is an unattached end.

13. The holder according to claim 10, wherein both tongue ends form a connection with a base body of the retention ring.

14. The holder according to claim 10, wherein the retention ring comprises tabs for resistance to rotation, which are bent vertically from the ring plane of a base body and which are executed without undercuts.

15. The holder according to claim 10, wherein the retention ring is fastened to the reflector by three connecting elements that are distributed over the circumference of a base body of the retention ring at approximately identical angles.

16. The holder according to claim 15, wherein the tongues are arranged in areas between the connecting elements.

17. The holder according to claim 15, wherein areas between the connecting elements form spring zones, which rebound from the ring plane of the retention ring once a maximal compression of the tongues is reached.

18. The holder according to claim 15, wherein the light source has holding arms engaging behind the retention ring in areas between the connecting elements.

19. A holder for a light source in the opening of a reflector for a vehicle headlamp, comprising:
a retention ring extending in a ring plane, for an arrangement on the reflector, wherein the light source is retentively arranged in the opening of the reflector,
wherein the retention ring has tongues holding the light source in the opening of the reflector by elastic spring deflection, the tongues having a first tongue end and a second tongue end, wherein the retention ring is fastened to the reflector by three connecting elements that are distributed over the circumference of a base body of the retention ring at approximately identical angles, and wherein the tongues are arranged in areas between the connecting elements.

20. The holder according to claim 19, wherein the tongues comprise a compliant area between the tongue ends protruding from the ring plane of the retention ring.

21. The holder according to claim 19, wherein the first tongue end has a connection with a base body of the retention ring extending in the ring plane and the second tongue end is an unattached end.

22. The holder according to claim 19, wherein both tongue ends form a connection with a base body of the retention ring.

23. The holder according to claim 19, wherein the retention ring is fastened to the reflector by at least one connecting element.

24. The holder according to claim 20, wherein areas between the connecting elements form spring zones, which rebound from the ring plane of the retention ring once a maximal compression of the tongues is reached.

25. The holder according to claim 19, wherein the light source has holding arms engaging behind the retention ring in areas between the connecting elements.

26. The holder according to claim 19, wherein the retention ring comprises tabs for resistance to rotation, which are bent vertically from the ring plane of a base body and which are executed without undercuts.

* * * * *